3,300,315
METHOD FOR THE MANUFACTURE OF DRY MILK PRODUCTS
Louis J. Nava, Redwood City, Jerry T. Hutton, Novato, John B. Shields, Sunnyvale, and Clayton A. Kempf, Berkeley, Calif., assignors to Foremost Dairies, Inc., San Francisco, Calif., a corporation of New York
Filed Mar. 20, 1963, Ser. No. 266,595
6 Claims. (Cl. 99—56)

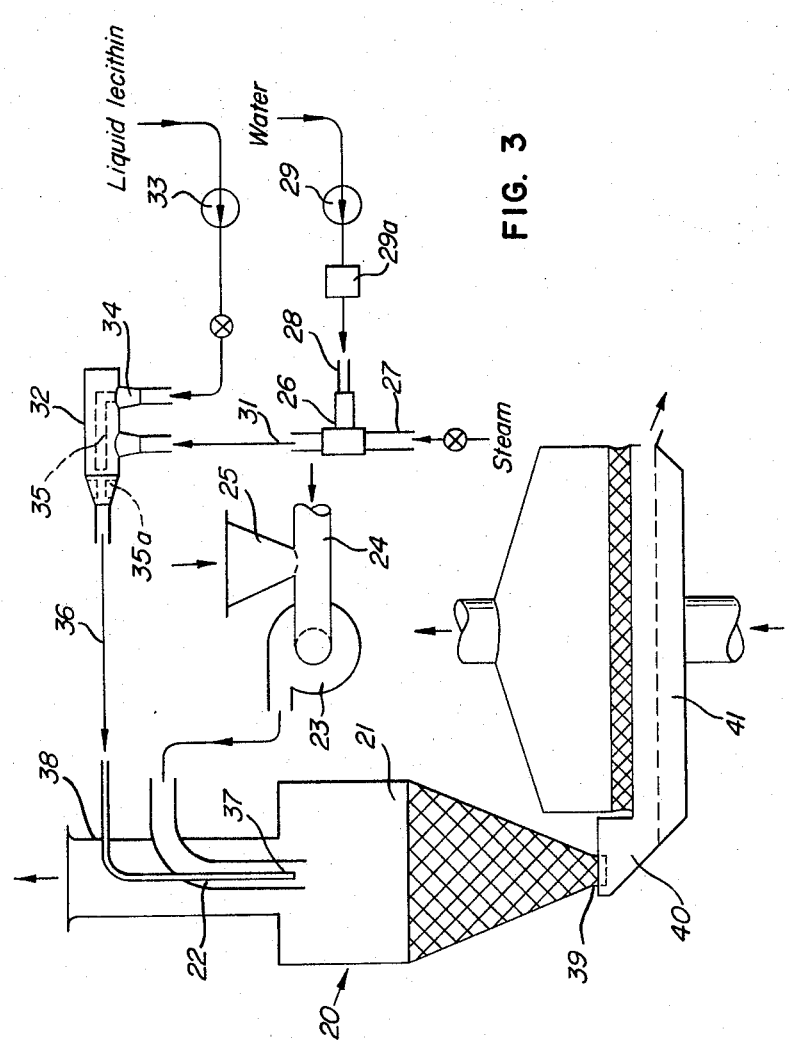

This invention relates generally to methods for the manufacture of dry fat-containing milk products.

It is well known that dry skim milk can be made in the so-called "instant" form. Instant skim milk differs from normal spray-dried products in that it has good wettability, and it can be readily dispersed in cold water by simple stirring. Its physical form differs from conventional spray-dried skim milk in that, in contrast with the small particle size possessed by spray-dried skim milk, the individual fragments are in the form of porous aggregates which may have a size such that the bulk of the fragments remain on a 100-mesh screen. Such an aggregated product has high wettability whereby when a quantity of the product is deposited upon the surface of cold water, the powder mass wets and sinks within a short interval, and it disperses upon simple stirring with a spoon, without the formation of sticky lumps. When known methods for the production of instantized milk are employed for the production of products having a substantial fat content, such as whole milk, the final product does not have the desired instant properties, although the physical characteristics appear to be similar to instant skim milk. Particularly when a quantity of such material is deposited upon the surface of cold water it does not tend to wet and sink but on the contrary it tends to float, and when stirred, sticky lumps are formed.

As disclosed in Shields, Nava and Kempf application Serial No. 672,893, filed July 19, 1957, for a "Dry Milk Product and Process of Manufacture" (Canadian Patent 630,063, October 31, 1961), the incorporation of lecithin in instant whole milk in a particular manner serves to improve wetting properties. Various procedures are disclosed in said copending application for effectively incorporating the lecithin. In accordance with one procedure, moist powder from a spray dryer is passed through a scroll-type mixer, and small measured amounts of lecithin are fed into the inlet end of the mixer, together with the powder. In accordance with another procedure anhydrous spray-dried milk powder is passed through a hydrating chamber, where it is moistened with water containing lecithin, and the moist particles are brought into random contacts to form moist porous aggregates which thereafter are dried. A third procedure described in said application involves dry mixing the lecithin with the dry anhydrous milk powder, after which the dry mix is subjected to an instantizing operation as described in Peebles Patent No. 2,835,586. In copending application Serial No. 53,498, filed September 1, 1960, entitled "Dry Milk Product and Process of Manufacture" (Belgian Patent 607,311, August 15, 1961), in the joint names of Spilman and Nava, another procedure is disclosed involving feeding lecithin to an atomizer which is employed to atomize the milk concentrate.

All of the procedures described above employ lecithin as an extraneous ingredient and are effective to substantially increase the wettability of instantized fat containing dry milk. However it has been found that when the products produced by these procedures are subjected to attrition, with resulting break-up of the aggregates, there is a marked deterioration in wettability. The reason for this deterioration is not completely understood, but according to our observations it is attributed to the manner in which the lecithin is distributed over the particles making up the aggregates.

A further characteristic of the product produced by the above described procedures is that after dispersion in cold water by simple stirring for a period of the order of ten seconds, some small lumps come to and float upon the surface. We attribute this to a small percentage of the milk aggregates which are not effectively provided with extraneous lecithin during processing, due to the inability of these procedures to attain application of extraneous lecithin to all of the product in a completely uniform manner.

In copending application Serial No. 56,531, filed September 16, 1960, in the joint names of Hutton, Nava, Shields and Kempf, there is disclosed a method for the manufacture of instantized milk involving the use of a conditioner which is continuously supplied with milk solids in moist discrete form, and within which the moist particles are rapidly heated and brought into random contacts to form moist porous aggregates. Thereafter the moist aggregates are subject to drying to remove excess moisture. The present invention is predicated upon our discovery that when liquid lecithin is supplied to such a conditioner in the manner hereinafter described, it is effectively and uniformly dispersed and bonded to the surfaces of the particles making up the aggregates. The resulting product is characterized by the fact that it can be subjected to attrition without seriously affecting its wettability and ability to quickly disperse in cold water with simple stirring.

In view of the foregoing it is a general object of the present invention to provide a novel method for the manufacture of dry fat-containing milk in instantized form.

Another object of the invention is to provide a novel procedure for incorporating lecithin with instantized products, whereby the lecithin is more uniformly distributed and is more effectively associated with the surfaces of the particles.

A further object is to provide a novel procedure which makes possible the manufacture of instantized dry fat-containing milk with relatively high pour bulk densities.

Another object of the invention is to provide a method capable of producing a fat-containing dry milk product which has high wettability in cold water, which readily disperses in cold water by simple stirring to produce a stable reconstituted milk, which immediately after dispersion does not evidence any floating lumps of undispersed material, and which after being reconstituted with cold water is not subject to substantial fat separation.

Additional objects of the invention would appear from the following description in which the preferred embodiments have been set forth in detail in conjunction with the accompanying drawing.

Referring to the drawing.

FIGURE 3 schematically illustrates apparatus for carrying out our method.

Figure 4:
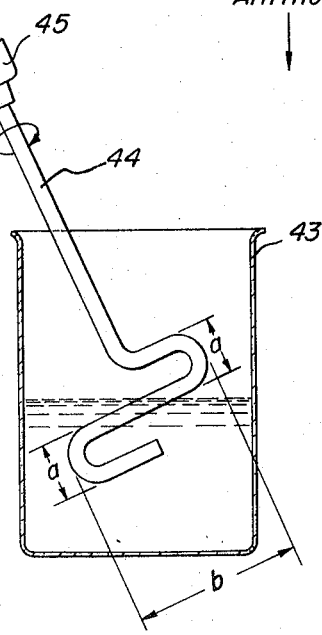

FIGURE 4 shows simple test equipment for reconstituting samples.

Figure 1:
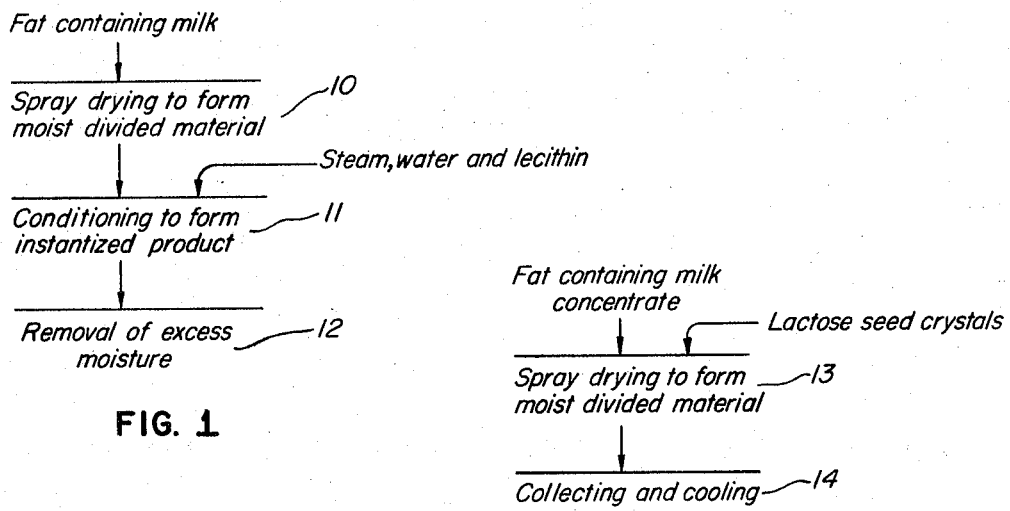
FIGURE 1 is a flow diagram illustrating one procedure for carrying out our method.

In accordance with the procedure shown in FIGURE 1, a fat-containing milk concentrate is subjected to spray drying in step 10 to produce a moist divided material. This moist material is supplied to the conditioner 11, where, under special conditions, the divided material is caused to form firm moist porous aggregates. The aggregates are then subject to drying in step 12 to remove excess moisture. As indicated, steam with atomized lecithin dispersed therein is supplied to the conditioning operation 11.

The fat-containing milk employed may in a typical instance be whole milk, having a butter fat content of about 28% (dry solids basis). It will be evident, however, that the method can be used with milk having a lower fat content, as for example milk having a fat content which may range from say 7 to 28%. Also the fat content may be somewhat greater than normal whole dried milk, as for example from 28 to 72%. Although particular reference has been made to dry products containing butter fat, various other fats or fat-like substances can be substituted for all or a part of the butter fat content. Such fats should be edible, relatively free from free fatty acids, and may have melting points of the order of 90 to 110° F. For example, reference can be made to any one of a number of edible hydrogenated vegetable oils such as hydrogenated cottonseed, peanut, and corn oil.

With respect to step 10, it is well known that spray dryers can be controlled to produce discrete or divided material of a desired moisture content. For the purposes of our method it is desirable for the spray dried divided material to have a moisture content within the range of from about 6 to 12.5% (total moisture), as the result of step 10, and that the material be within this moisture range as it is supplied to the conditioning operation 11. The handling and collecting of this moist divided material, as by use of one or more cyclone separators, will in typical instances result in some cooling of the material, whereby as discharged from collecting cyclones the powder may be at a temperature within the range of about 100 to 125° F. As the divided material is supplied to the conditioning operation 11, it may in typical instances be within a temperature range of from about 75 to 115° F. The atmosphere to which the moist particles are subjected in the conditioning operation 11, may be said to be wet steam, in that it consists of steam containing dispersed water droplets. Liquid lecithin in atomized form is homogeneously dispersed within the wet steam, as by the procedure presently to be explained.

As the moist divided material is introduced into the conditioning operation 11, it is rapidly heated by contact with steam and hot atomized droplets, whereby it is rapidly elevated to a temperature level within the range of about 120 to 160° F. The particles of divided material are caused to become sticky in this conditioning operation, and they are intermingled whereby they are brought into random contacts. As a result random porous moist aggregates are formed, the aggregates comprising the moist particles from step 10 firmly bonded together at points of contact.

The divided material preferably absorbs some additional moisture in operation 11. Thus assuming that the divided material from step 10 has a moisture content within the range of from 6 to 12.5%, the moisture content may be increased by an added 2 to 8%, whereby the aggregates from operation 11 may range in moisture content from 10 to 16.5%.

In conjunction with flash heating and the formation of aggregates, the dispersed atomized lecithin deposited upon the moist particles becomes homogeneously distributed over the surfaces of the individual particles and the aggregates made therefrom.

Suitable known procedures can be employed for removing excess moisture in step 12, whereby the moisture content is reduced to a value of the order of 1.5 to 3%. Thus the powder can be passed through a series of shaker dryers of the type described in Peebles 2,835,586. The temperature of the drying air employed may be within the range of from about 250 to 300° F. The final dried material may be sized by conventional screening methods. For example material under 80-mesh screen size, may be returned to the process, and oversized material greater than say 12 to 20 mesh, may be subdivided by crushing.

With respect to step 10, it has been found desirable to employ seeding as disclosed in Sharp 2,728,678. Thus immediately before being supplied to the spray dryer, seed crystals of lactose are introduced into the concentrate. By way of example, the amount of seed crystals introduced can amount to from 0.1 to 10% of the total lactose present. Preferably the seed crystals are of small size, such as impalpable powder of minus 300 mesh. Seeding as just described provides a divided spray dried material which can be better handled, and which is more susceptible to effective aggregating. Assuming that seeding is employed then the divided material supplied to operation 11 has a minor percentage of lactose content in the form of crystalline alpha lactose monohydrate, and the remainder of the lactose is in the amorphous or non-crystalline form.

Figure 2:
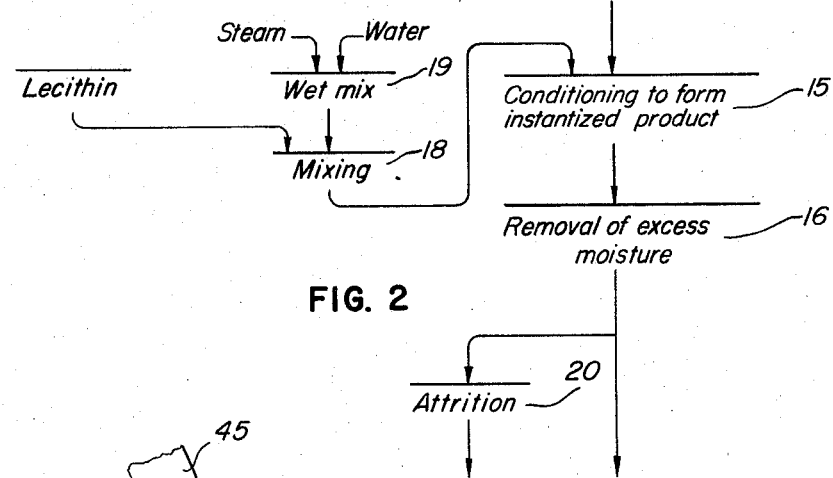
FIGURE 2 is a flow diagram illustrating a more detailed procedure for carrying out our method.

In accordance with the more detailed FIGURE 2, a fat-containing milk concentrate, such as whole milk concentrate, is supplied to the spray drying operation 13, and lactose seed crystals are employed in the manner described above. The moist divided material from step 13 is subjected to collection and cooling in step 14, and is then supplied to the conditioning operation 15, carried out like the conditioning operation 11 of FIGURE 1. The liquid lecithin supplied to the method is shown being atomized and mixed at 18 with the wet steam mix from step 19. Such a wet steam mix can be prepared by use of suitable means for intermixing water and steam in predetermined proportions. The moist porous agglomerates from step 15 are shown being subjected to final drying in step 16.

As is well known, lecithin is the commercial or popular name for a crude mixture of compounds which may be more accurately designated as phosphatides or phospholipids. The phosphatides are complex organic compounds which are similar to fats or lipids, but differ from fats radically enough to give them unique properties. Lecithins of vegetable oil origin are mixtures of phosphatides produced from such raw materials as cottonseed oil, corn oil, or soybean oil. Products from current commercial treatments modifying natural lecithin to emphasize either the lipolilic groups or the hydrophilic groups, may be used for our purpose. Commercially available soya lecithin has been used with good results. It is commercially available as a liquid material with lecithin dispersed in a soybean oil carrier. Assuming that the liquid lecithin product contains about 60% lecithin(s), to obtain a final product containing from say 0.17 to 0.6% lecithin, from 0.25 to 1.0% of the lecithin product can be employed.

FIGURE 3 schematically illustrates suitable apparatus for carrying out the method. The conditioner 20 consists of a chamber 21 having provision for introducing the moist divided material, and for removing the moist aggregates. Material is introduced by way of conduit 22, which is shown connected to the discharge side of the blower 23. Preferably the inner portion of this conduit is heat insulated. The suction conduit 24 extending to the blower may draw in atmospheric air, and is connected with the feed hopper 25, into which the moist spray dried material is introduced. Thus the moist divided material is dispersed in air, and the dispersion is introduced into one end of the chamber 21, through the conduit 22. A steam mixer 26 is used for generating wet steam. A pipe 27 connects to a source of steam at constant pressure, and the pipe 28 connects with means for introducing water at a measured rate, as for example a metering pump 29 and rotometer 29a. The discharge pipe 31 from aspirator 26 connects with the mixing device 32. Liquid lecithin is also supplied to the mixing device 32, by the metering pump 33. The interior of the device 32 consists of a closed elongated chamber into one side of which the wet steam mix is introduced. Liquid lecithin is introduced into the chamber of device 32, by way of pipe 34 and the inner tube 35. Outlet pipe 36 connects one end of the device 32 with a nozzle 37, which is located near the discharge end of the conduit 22. Within the tapered outlet end of device 32 swirl means is provided, such as the inclined swirl vanes 35a that are near the discharge end of tube 35. Thus wet steam leaving device 32 is subjected to intense swirling that serves to effectively atomize the lecithin and to homogeneously intermix the vapor, water droplets, and atomized droplets of the lecithin.

Preferably the chamber 21 is vented to the atmosphere through the conduit 38. In normal operation some of the air introduced into chamber 21 may pass to the atmosphere through this conduit. The portion of pipe 36 that is within conduits 22 and 38 may be heat insulated. The discharge end of chamber 21 is shown connected to the discharge conduit 39, which directly delivers the material into the feed hopper 40 of the dryer 41. This dryer may be the first one of a series of shaker dryers through which the material passes. Dryers of this type, which pass drying air through a bed of the material on the shaking screen, are described in Peebles 2,835,586.

Operation of the apparatus shown in FIGURE 3 is as follows: Water at a measured rate is supplied to the mixer 26 where it intermixes with steam being supplied at a constant rate. The wet steam thus formed is supplied to the mixing device 32 from the mixer 26. Within the inner chamber of the mixing device 32, the flow of wet steam atomizes the inflowing liquid lecithin and is homogeneously mixed therewith. This hot wet atmosphere with atomized droplets of lecithin is then supplied to the chamber 21, where it is intermingled with the air and moist divided material being introduced by way of conduit 22. Rapid heat transfer occurs from the wet hot atmosphere to the moist particles, with the result that the moist particles are flash heated to the elevated temperature level previously described. The moist particles are thereby caused to become sticky, and as they progress through the chamber 21, they are brought into random contacts whereby the particles adhere together in the form of moist porous aggregates. Simultaneously with flash heating and the formation of the aggregates finely atomized, the lecithin is deposited upon the surfaces of the particles and the aggregates, and thus the lecithin is homogeneously distributed, without however being dispersed to any substantial extent into the liquid already contained in the moist divided material, or in the fat content of the particles. After being discharged from the chamber 21 the aggregates are subjected to final drying.

The milk product produced by our method possesses novel characteristics which distinguish it from lecithin containing instantized milk products such as have been produced by other procedures previously described. Particularly when the product is subjected to abrasive handling, it has been found that wettability is not materially deteriorated. In contrast when products made by one of the procedures described in the aforementioned copending application Serial No. 672,893, filed July 19, 1957, are subjected to abrasive handling, wettability is materially impaired. According to our observations the lecithin content is homogeneously and uniformly dispersed upon the surfaces of the aggregates and the particles making up the aggregates, and its distribution remains substantially the same, even though the aggregates are reduced in size by crushing.

It has been found that the present method is economical with respect to the amount of lecithin required to produce a given wettability. For example in instantized whole milk powder made in accordance with the present method, with a lecithin content of 0.3%, has a wettability which is equal to or greater than that possessed by a whole milk powder made by one of the procedures set forth in said copending application Serial No. 672,893, with a lecithin content of 0.6%.

When made as described above, the product produced is relatively light in weight, having a pour bulk density of the order of 0.20 to 0.30 gms. per ml. In some instances it is desirable to produce an instantized fat-containing milk product of greater pour bulk density than specified above. Because of its properties, the product from step 16 can be reduced in size to attrition in step 20, thus producing a material of higher bulk density but with substantially the same desirable instant properties. Preferably attrition is carried out by use of an impact mill that avoids conventional grinding or crushing such as is carried out in ordinary hammer mills. Thus it is satisfactory to use impact mills of the type known by the trade name of Entoliter, or a Sprouts-Waldron Attrition Mill, which reduce the size of the material by shattering impacts of aggregates, without crushing or breaking up the aggregates into their component particles. In a typical instance a product having a pour bulk density of the order of 0.20 to 0.30 gms. per ml., and of such size that from 80 to 90% remains on a 60-mesh screen, can be reduced by one pass through a Sprouts-Waldron mill to a bulk density of from 0.40 to 0.50, with the aggregates being of such size that from 50 to 55% will remain on a 100-mesh screen. A product of even higher density can be obtained by more than one pass through the same mill. Thus by two passes through the same mill pour densities of the order of 0.50 to 0.53 gms. per ml. can be obtained.

Simple tests can be applied to the products produced to demonstrate their desirable properties. In general, the product after step 16 and before attrition in step 20, has excellent instant properties. It is highly wettable and quickly dispersible in cold water (e.g., 68° F.) by simple stirring to form a stable reconstituted milk. After being reconstituted in cold water, a period of storage does not result in any noticeable separation of fat, assuming that the milk being supplied to the process has been effectively homogenized. Again having reference to the product produced before attrition in step 20, a period of stirring of the order of ten seconds generally suffices to form a stable reconstituted milk with complete dissolution. After attrition in step 20, the product retains its desirable instant properties. The only noticeable change, aside from the size of the aggregates and the higher bulk density, is that a somewhat longer stirring time is required to complete dissolution. For example, a product having a bulk density of the order of from 0.40 to 0.50 gms. per ml. can be completely dispersed in cold water to form a stable reconstituted milk in a stirring period of the order of thirty seconds. Denser products ranging from 0.50 to 0.53 gms. per ml. require some extension in the stirring time or some increase in the stirring speed, over the less dense products. However, the "instant" properties are retained to a degree such that the denser products can be marketed as instantized, and can be successfully used by domestic consumers to form stable reconstituted milk with tap water by simple stirring with a spoon.

The test equipment illustrated in FIGURE 4 has been used to provide a standardized test for dispersibility. This equipment includes a standard glass beaker 43 which is 4¾ inches high and 3⅜ inches inside diameter. The stirring rod 44 is ¼ inch in diameter and its axis of rotation is inclined about 25° to the vertical. It is attached to an electric motor 45 whereby it is driven at a speed of 160 r.p.m. The loops formed in the lower end of the rod are in a common plane. Each loop dimension $a$ is ⅞ inch, and the over-all loop length $b$ is 2½ inches. Under static conditions the lower loop is immersed as shown.

When the above described test equipment is employed, 325 ml. of water at 68° F. is introduced into the beaker. The lower loop of the stirring rod is immersed in the water, and the motor energized. Thirty grams of the powder to be tested is then poured upon the surface of the water. When a typical dry product produced by our method, but without final attrition, is tested by the use of this equipment in the manner just described, complete dissolution occurs in a period of the order of ten seconds or less. When the same test is applied to the fractured material resulting from step 20, with a pour density ranging from 0.40 to 0.50 gms. per ml., complete dissolution occurs in a period of not more than about thirty seconds. The same test applied to material from step 20, but at a pour bulk density of 0.52 resulted in complete dissolution in a period of about thirty seconds, with the stirring rod rotating at 160 r.p.m.

Specific examples of our invention are as follows:

*Example 1*

Whole milk was concentrated by vacuum evaporation to 46% solids. This concentrate was fed to a spray dryer, with temperatures and flow rates of the drying air adjusted whereby the resulting moist milk solids had a moisture content of 8% (total), and were discharged from the cyclone separator at a temperature of about 95° F. Seed crystals of lactose were introduced with the concentrate immediately before supplying the concentrate to the spray dryer. The amount of lactose thus added amounted to 0.1% of the lactose content of the concentrate. The size of the seed crystals was such that the bulk of the crystals passed through a 300-mesh screen. The material discharging from the spray dryer, comprising the moist milk solids and a conveying stream of air, was separated in a cyclone separator, and the collected material was fed to the hopper 25 of FIGURE 3 at temperature of about 95° F. A commercial liquid soya lecithin product was supplied at a uniform rate by pump 33 to the nozzle 32. The amount of this product used was such that it amounted to about 0.65% of the final dried product (i.e., about 0.4% lecithin). Wet steam at a pressure of 90 p.s.i.g. was supplied to the mixer 26, to produce a wet steam. This was supplied to the mixer 32, to atomize the lecithin and form a homogeneous mixture therewith. The chamber 21 was about fifteen feet long, and about five feet in diameter. The moist material from the spray dryer cyclone was supplied continuously to the hopper 25, and was then delivered with an air stream to the chamber 21, through conduit 22. The material leaving chamber 21 through conduit 39 comprised aggregates, which were separated out from the conveying air stream in cyclone 20. As removed from chamber 21, the aggregates were at a temperature of 140° F. and had a total moisture content of 15%. The separated material from the hopper 40 was then subjected to drying to reduce the moisture content to above 2%. The resulting product was instantized whole milk of excellent quality, having a pour bulk density of 0.25 gms. per ml. It has excellent wettability and dispersibility in cold water. When subjected to the standardized test described with reference to FIGURE 4, it completely dispersed in a stirring period of ten seconds, to produce a reconstituted milk having its surface free of floating material. No appreciable fat separation was noted during subsequent storage.

*Example 2*

The product produced in Example 1 was passed once through a Sprouts-Waldron Attrition Mill, with the rotor of the mill operating at a speed of about 1800 r.p.m. The resulting product had a bulk density of about 0.39 gms. per ml., and the size was such that about 55% of the material remained on a 100-mesh screen. A screen analysis of the product was as follows:

| Mesh size: | Percent |
|---|---|
| On 60 | 24 |
| On 80 | 19 |
| On 100 | 12 (55) |
| Through 100 | 45 |

When the product of Example 2 was subjected to the standardized test procedure described with reference to FIGURE 4, the product completely dispersed in cold water (68° F.) over a stirring period of thirty seconds. At that time the surface of the reconstituted milk was free of floating material. This demonstrated that the higher bulk density material had good instant properties and was suitable for sale to the domestic trade. No appreciable fat separation was noted during subsequent storage.

*Example 3*

The product from Example 2 was repassed through the Sprouts-Waldron mill to produce a denser product having a pour bulk density of 0.52 gms. per ml. and a screen analysis as follows:

| Mesh screen: | Percent |
|---|---|
| On 60 | 2 |
| On 80 | 3 |
| On 100 | 6 |
| On 150 | 30 |
| On 200 | 30 |
| Through 200 | 28 |

When subjected to the above described test procedure, but with the rod 44 rotating at 160 r.p.m., it completely dispersed over a period of thirty seconds to form a stable reconstituted milk.

Reference is made to our copending application Serial No. 238,601, filed November 19, 1962, for "Process and Apparatus for Producing Instantized Products."

We claim:

1. In a method for the manufacture of instantized fat-containing milk, the steps of spray drying fat-containing milk concentrate to form discrete moist particles of milk products having a moisture content of the order of from 6 to 12.5%, rapidly heating such moist particles while dispersed to a temperature level of about from 130 to 160° F., said heating being by virtue of subjecting the particles to a premixed atmosphere of steam and liquid droplets containing lecithin finely dispersed therein, whereby the moist particles are heated by the steam and caused to become sticky and caused to adhere together in the form of moist aggregates with lecithin incorporated thereon, the amount of lecithin used being such as to provide a lecithin content of from 0.1 to 1% in the final product and thereafter removing excess moisture from the aggregates.

2. A method as in claim 1 in which the atmosphere is formed by homogeneously intermixing atomized liquid lecithin with wet steam.

3. A method as in claim 1 in which the dry aggregates are reduced in size by impact attrition to produce a product of greater bulk density.

4. In a method for the manufacture of instantized fat-containing milk solids, the steps of spray drying fat-containing milk concentrates to form moist discrete particles of milk solids having a moisture content of the order of 6 to 12.5%, causing such moist particles, while dispersed, rapidly to be heated to a temperature level of about from 130° to 160° F., said heating being by virtue of contact of the moist particles with a premixed atmosphere of wet steam and droplets containing lecithin finely dispersed therein, whereby the particles are caused to become sticky and whereby lecithin is incorporated therewith, the amount of lecithin used being such as to provide a lecithin content of from 0.1 to 1% in the final product causing the sticky particles to be intermingled whereby they are caused to adhere together in the form of moist porous aggregates, and then removing excess moisture from the moist aggregates.

5. A method as in claim 4 in which lactose seed crystals are incorporated in the spray dried moist discrete particles.

6. A method as in claim 4 in which the lecithin is dispersed in the atmosphere of wet steam by atomizing the lecithin and homogeneously mixing the atomized material with a flowing stream of wet steam, said mixture being conveyed to a confined region to maintain said atmosphere therein.

References Cited by the Examiner

UNITED STATES PATENTS 2,953,458 9/1960 Sjollema _____ 99—56
3,120,438 2/1964 McIntire et al. _____ 99—56

FOREIGN PATENTS 226,996 2/1960 Australia.

A. LOUIS MONACELL, *Primary Examiner.*
M. W. GREENSTEIN, *Assistant Examiner.*